(12) United States Patent
Nikkanen et al.

(10) Patent No.: US 8,605,172 B2
(45) Date of Patent: Dec. 10, 2013

(54) DIGITAL CAMERA DEVICE AND METHOD FOR IMPLEMENTING A DIGITAL ZOOM HAVING A QUALITY FACTOR AS AN INPUT FOR A JPEG ENCODER IN DIGITAL CAMERA DEVICES

(75) Inventors: Jarno Nikkanen, Tampere (FI); Ossi Kalevo, Toijala (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/361,058

(22) Filed: Jan. 30, 2012

(65) Prior Publication Data
US 2012/0194708 A1 Aug. 2, 2012

Related U.S. Application Data

(63) Continuation of application No. 11/169,220, filed on Jun. 27, 2005, now Pat. No. 8,106,956.

(51) Int. Cl.
*H04N 5/262* (2006.01)
(52) U.S. Cl.
USPC .................................................. 348/240.2
(58) Field of Classification Search
USPC .......................................... 348/240.2, 222.1
See application file for complete search history.

(56) References Cited

U.S. PATENT DOCUMENTS

| | | | | |
|---|---|---|---|---|
| 5,172,234 | A | 12/1992 | Arita et al. ................. | 348/240.2 |
| 5,249,053 | A | 9/1993 | Jain .............................. | 358/209 |
| 5,477,264 | A | 12/1995 | Sarbadhikari et al. ..... | 348/231.6 |
| 6,507,704 | B2 | 1/2003 | Enomoto ...................... | 396/60 |
| 6,650,366 | B2 | 11/2003 | Parulski et al. ............. | 348/231.6 |
| 6,650,368 | B1 * | 11/2003 | Doron ......................... | 348/240.2 |
| 6,920,250 | B1 * | 7/2005 | Kletter et al. ................ | 382/233 |
| 7,142,236 | B2 | 11/2006 | Matsumura .............. | 348/240.99 |
| 7,345,774 | B2 | 3/2008 | Schinner ...................... | 358/1.12 |
| 7,362,360 | B2 | 4/2008 | Kim et al. ................... | 348/231.2 |
| 7,397,502 | B2 | 7/2008 | Shiraishi .................... | 348/223.1 |
| 7,420,598 | B1 * | 9/2008 | Ito .............................. | 348/240.2 |

(Continued)

FOREIGN PATENT DOCUMENTS

| | | |
|---|---|---|
| EP | 1670241 A2 | 6/2006 |
| GB | 2356515 A | 5/2001 |

(Continued)

OTHER PUBLICATIONS

User's manual for hp photosmart 930 series digital camera, © 2003, Hewlett-Packard Company, pgs. 8-116.
User's manual for Sony Digital Still Camera DSC-F828, © 2003, Sony Corporation, 159 pgs.

*Primary Examiner* — Gary C Vieaux
(74) *Attorney, Agent, or Firm* — Harrington & Smith

(57) ABSTRACT

A device having a digital zoom function to form an output image, including a sensor and optics to produce a primary image, a display in which the primary image is arranged to be cropped in connection with the digital zoom function to form said output image, user interface means to set one or more settings relating to the digital zoom function and a image processor arranged to put a size for said output image based on the cropping of the primary image. The user interface arranged to be set as said setting one or more size limit for said output image and based on the one or more size limit and the size of the cropped primary image, the image processor arranged to perform scaling operations for the cropped primary image at least in part of the digital zoom range defined by said one or more size limit.

12 Claims, 12 Drawing Sheets

(56) References Cited

U.S. PATENT DOCUMENTS

| | | | |
|---|---|---|---|
| 7,787,026 B1 | 8/2010 | Flory et al. | 348/231.99 |
| 2004/0017491 A1 | 1/2004 | Stavely | 348/240.2 |
| 2004/0080660 A1 | 4/2004 | Battles et al. | 348/345 |
| 2004/0257380 A1* | 12/2004 | Herbert et al. | 345/619 |
| 2005/0219386 A1 | 10/2005 | Stavely et al. | 348/240.3 |
| 2006/0125937 A1 | 6/2006 | LeGall et al. | 348/240.99 |
| 2006/0221198 A1 | 10/2006 | Fry et al. | 348/222.1 |

FOREIGN PATENT DOCUMENTS

| | | |
|---|---|---|
| JP | 20000115605 A | 4/2000 |
| JP | 2001145010 A | 5/2001 |
| JP | 2001167265 A | 6/2001 |
| WO | WO 2004/068852 A1 | 8/2004 |

\* cited by examiner

DIGITAL CAMERA DEVICE AND METHOD FOR IMPLEMENTING A DIGITAL ZOOM HAVING A QUALITY FACTOR AS AN INPUT FOR A JPEG ENCODER IN DIGITAL CAMERA DEVICES

CROSS REFERENCE TO RELATED APPLICATION

This is a continuation patent application of U.S. patent application Ser. No. 11/169,220 filed on Jun. 27, 2005, now U.S. Pat. No. 8,106,956.

FIELD OF THE INVENTION

The invention concerns digital camera device having a digital zoom function in order to form an output image, which device includes
  a sensor and optics to produce an primary image,
  a display in which the primary image is arranged to be cropped in connection with the digital zoom function in order to form the said output image,
  user interface means to set one or more settings relating to the digital zoom function and
  a image processor which is arranged to put a size for the said output image based on the cropping of the primary image at least in part of an digital zoom range.
In addition, the invention also concerns methods and corresponding program products.

BACKGROUND OF THE INVENTION

Zoom is used in digital cameras to crop out uninteresting parts of the view and to enlarge the interesting part of the view. Optical zoom genuinely enlarges the image and introduces new details and information to the image.

Digital zoom is also commonly included in digital cameras, either as a complement to the optical zoom or as the sole zooming method in low-end digital cameras. Digital zoom uses a primary image that is produced by camera optics and an imaging sensor as an input, and thus digital zoom does not introduce genuine new details to the image. Digital zoom either crops the input image and thus reduces the image resolution, or crops the input image and then interpolates, or in general, upscales the image to some higher resolution than the cropped resolution, for example, back to the original input resolution.

No information is lost from the ROI (Region of Interest) in the cropping but only the information outside the ROI. Similarly, no genuine new information is introduced in the interpolation; new values are estimated into each location (x, y) of the output image according to certain neighbourhood of pixels that correspond to location (x, y) in the cropped input image. For example, bilinear or bicubic interpolation are typically used in connection with this measure.

Typically the digital zoom in digital cameras operates in a following manner. The input primary image produced by the sensor and the optics is cropped according to the digital zoom factor and then the cropped image is interpolated back to the original resolution in order to produce the final output image. However, the activation of the digital zoom in the UI (User Interface) may vary.

Some manufacturers have a bit more sophisticated digital zoom methods. For example, Sony has a "SmartZoom" concept that is introduced in some devices [1]. The "SmartZoom" concept may operate in the following manner: 1) user selects output_resolution. This must be lower than the original_sensor_resolution. 2) The user enables SmartZoom. 3) The user uses zoom ring to zoom (i.e. optical zoom). 4) The system crops output_resolution_sized subimage from the original image. The resolution of that is original_sensor_resolution.

Thus, when using SmartZoom, the minimum zoom factor i.e. optical+digital is not ×1, but it is (original_sensor_resolution/output_resolution). This is bigger than ×1. The maximum zoom factor is increased to {optical_zoom_factor* (original_sensor_resolution/output_resolution)}.

SmartZoom does not deteriorate the image quality as much as the traditional digital zoom methods, which is due to use of simple cropping instead of interpolation+downscaling combination. However, the user cannot enable SmartZoom before he selects a lower resolution than original_sensor_resolution as the output_resolution.

Also, the HP PhotoSmart 935 digital camera [2] has at least the following digital zoom features 1) no interpolation is used, only cropping and 2) the actual pixel size that results from the digital zoom (cropping) is displayed on the viewfinder. According to quick tests, the JPEG compression factor seems to change from a fixed setting A into fixed setting B when a digital zoom operation is performed.

The aforementioned prior art solutions don't take into account further use applications. One of these further use applications is to produce a hard copy. Image quality problems arise due to the consecutive scaling measures that are performed in both directions (i.e. upscaling and downscaling). Problems may also arise due to the fact that scaling measures are performed as post-processing. This may cause the image, for example, to include artefacts.

SUMMARY OF THE INVENTION

The purpose of the present invention is to bring about ways to perform a digital zooming procedure with digital camera devices. The invention is a digital zoom system (UI and system level inventions) for devices that contain digital camera sensor(s).

The characteristic features of the digital camera devices according to the invention, the characteristic features of the methods according to the invention, and program products according to the invention, are presented in the appended claims.

In the invention, when the end user performs digital imaging, the invention instructs the processor of the device how to perform a smart digital zoom function such that there is always a benefit in connection with the further use or processing of the produced digital image. The digital zooming may now perform in a dynamical manner. The user may set one or more size limits or size setting for the output image size based on the suitable scaling measures which are then performed.

The first digital camera device according to the invention has a digital zoom function in order to form an output image. The device includes a sensor and optics to produce a primary image, a display in which the primary image is arranged to be cropped in connection with the digital zoom function in order to form the said output image, user interface means to set one or more settings relating to the digital zoom function and image processor which is arranged to put a size for the said output image based on the cropping of the primary image, at least in part of a digital zoom range. The user interface of the device is arranged to be set as the said setting wherein one or more size limits for the said output image may be based on the one or more size limits and the size of the cropped primary image. The image processor is arranged to perform scaling operations for the cropped primary image based on, at least in part, the digital zoom range defined by the said one or more size limit.

The second digital camera device according to the invention includes also a sensor and optics in order to produce a primary image, a display in which the primary image is arranged to be cropped in connection with the digital zoom function in order to form the said output image and image processor which is arranged to store the output image using a quality factor set for it. The quality factor is connected to the size of the cropped primary image.

The third digital camera device according to the invention includes also a digital zoom function in order to form an output image. The device includes a sensor and optics to produce a primary image, a display in which the primary image is arranged to be cropped in connection with the digital zoom function in order to form the said output image, user interface means to set one or more settings relating to the digital zoom function and image processor which is arranged to put a size for the said output image based on the cropping of the primary image and to store the said output image using a quality factor set for it. The user interface is arranged to be set as the said setting wherein one or more size limits for the said output image may be based on the one or more size limits and the size of the cropped primary image. The image processor is arranged to perform scaling operations for the cropped primary image based on, at least in part, the digital zoom range defined by the said one or more size limits. The said quality factor is connected to the size of the cropped primary image.

The fourth digital camera device according to the invention includes a digital zoom function in order to form an output image. In addition, the device includes a sensor and optics to produce a primary image, a display in which the primary image is arranged to be viewed in connection with digital imaging, a user interface means to set one or more settings relating to the digital zoom function, and an image processor which is arranged to process the primary image in order to form the said output image. The user interface is arranged to be set as the said setting based on at least one size setting for the said output image. The image processor is arranged to perform scaling operations for the primary image. The said processing produces the output image having the size of the set size setting.

Furthermore, the invention concerns also a first method to be performed in connection with a digital zoom function in order to form an output image. In the method, the user sets one or more settings relating to the digital zooming procedure. A primary image is produced. The primary image is cropped in connection with the digital zooming procedure in order to form the said output image. A size for the said output image is set on the basis of the cropping of the primary image based on, at least in part, a digital zoom range. The said output image is set as the said setting wherein one or more size limits may be based on the size of the cropped primary image. Scaling operations may be performed for the cropped primary image based on, at least in part, the digital zoom range defined by the said one or more size limits.

The invention concerns also a second method to be performed in connection with a digital zooming procedure in order to form an output image in which a primary image is produced. The primary image is cropped in connection with the digital zooming procedure in order to form the said output image and output image is stored using a quality factor set for it. The quality factor is calculated on the basis of the size of the cropped primary image.

The invention concerns also a third method to be performed in connection with a digital zooming procedure in order to form an output image in which a user sets one or more settings relating to the digital zooming procedure. A primary image is produced. The primary image is cropped in connection with the digital zooming procedure in order to form the said output image. A size for the said output image is set on the basis of the cropping of the primary image and based on, at least in part, a digital zoom range. The output image is stored using a quality factor set for it. The said output image is set as the said setting based on the one or more size limits and the size of the cropped primary image. Scaling operations are performed for the cropped primary image based on, at least in part, the digital zoom range defined by the said one or more size limits. The said quality factor is calculated on the basis of the size of the cropped primary image.

The invention concerns also a fourth method to be performed in connection with a digital zooming procedure in order to form an output image in which a user sets one or more settings relating to the digital zooming procedure. A primary image is produced and the primary image is processed in order to form the said output image. The said output image is set as the said setting based on at least one size setting for the primary image. Scaling operations are performed (as the said processing) in order to produce the output image (having the size of the set size setting).

Furthermore, the first program product for performing the digital zoom function (in order to form an output image in a digital camera device) includes a storing means and a program code executable by a processor (and written in the storing means). The program code includes first code means configured to set one or more settings via a user interface relating to the digital zoom function, second code means configured in connection with the digital zoom function to crop (in the user interface) a primary image produced by an imaging means in order to form the said output image. A third code means configured to set a size for the said output image on the basis of the cropping of the primary image based on, at least in part, a digital zoom range. In addition, the program code also includes fourth code means configured (in the user interface) to set one or more size limits for the said output image. A fifth code means configured to perform scaling operations for the cropped primary image based on, at least in part, the digital zoom range defined by the said one or more size limits. Scaling operations are configured to be based on the one or more size limits and the size of the cropped primary image.

The second program product for performing digital zoom function (in order to form an output image in a digital camera device) includes a storing means and a program code executable by a processor (written in the storing means). The program code includes first code means configured, in connection with the digital zoom function, to crop (in the user interface) a primary image produced by an imaging means in order to form the said output image. A second code means configured to store the output image using a quality factor set for it. In addition, the program code also includes third code means configured to determine the quality factor to be used based on the size of the cropped primary image.

The third program product may be configured for performing a digital zoom function in order to form an output image in a digital camera device. The program product may include a storing means and a program code executable by a processor and written in the storing means. The program code includes first code means configured to set one or more settings via a user interface relating to the digital zoom function. A second code means configured in connection with the digital zoom function to crop (in the user interface) a primary image produced by an imaging means in order to form the said output image. A third code means configured to set a size for the said output image based on the cropping of the primary image and, at least in part, a digital zoom range. Code means configured to store the output image using a quality factor set for it. The program code also includes fourth code means configured (in the user interface) to set one or more size limits as the said setting for the said output image. A fifth code means configured to perform scaling operations for the cropped primary image based on, at least in part, the digital zoom range defined by the said one or more size limits. Scaling operations may be configured to be based on the one or more size limits. The size of the cropped primary image and code means configured to determine the quality factor to be used may be based on the size of the cropped primary image.

The fourth program product may be configured for performing a digital zoom function in order to form an output image in a digital camera device. The program product may include a storing means and a program code executable by a processor (and written in the storing means). The program code includes first code means configured to set one or more settings via a user interface relating to the digital zoom function. A second code means configured, in connection with the digital zoom function, to view in the user interface a primary image produced by an imaging means in order to form the said output image. A third code means configured to process the primary image in order to form the said output image. The program code also includes fourth code means configured (in the user interface) to set (as the said setting) at least one size setting for the said output image. A fifth code means configured to perform scaling operations for the primary image (as the said processing) in order to produce the output image (having the size of the set size setting).

The size limit (or sizes) according to the invention may be, for example, a minimum size for the said output image, a maximum size for the said output image, or at least one output size for an output image. Other limits are also possible. Different kinds of combinations of the listed limits above are also possible. The scaling operations may be upscaling and/or downscaling. The size limit defines which scaling operations have been performed, if any. Thus, the digital zoom implemented in connection with the device may be understood as a certain kind of a dynamical implementation. The size of the cropped area of the primary image (i.e. the size of the region of interest and/or the nominal resolution of the sensor) will thus contribute to the function of the digital zooming procedure.

According to examples of the invention, numerous advantages to carry out a digital zooming procedure for an image in connection with a digital imaging device are achieved. A first advantage is achieved in the usability of the camera device. The user has no more need for deep knowledge concerning the digital zoom function. The user needs only to set some size limits in the user interface of the device for the output image and then the device itself decides the suitable measure that is needed (if any) to get the output result image desired for the further use.

The second improvement achieved with the invention is providing a reasonable file size. Often, when the photocopy is intended to be produced from the output image, there is no need to provide a high resolution. If the intended photocopy size is, for example, postcard size, the resolution that is required to produce a photocopy having reasonable quality is only something between 1-2 Mpix, for example.

Thirdly, the invention improves also the image quality in comparison to the traditional digital zoom systems in digital cameras. Improvement is introduced especially in mobile imaging devices that have less memory and processing power, and that have additional restrictions (e.g. MMS file size limitations).

Fourthly, the invention improves also the image quality especially in a case in which the photocopy is intended to produce from an image that is produced by a sensor having nominal resolution below than the desired photocopy size. If the scaling measures to the desired photocopy size are performed according to the invention, the advantage is achieved by reducing the amount of artefacts that would otherwise appear if the scaling measures would be performed as post-processing after the imaging process (imaging process that includes e.g. sharpening that should be done only once and only after scaling) and (lossy) image compression.

The invention is particularly suitable for digital imaging that is intended to produce such images which are intended to be printed as photocopies. According to examples of the invention, a multiple consecutive up- and downscaling operations performed for an output image are avoided that, is known from the current prior art.

Other characteristic features of the invention will emerge from the appended Claims, and more achievable advantages are listed in the specification.

BRIEF DESCRIPTION OF THE DRAWINGS

The invention, which is not limited to the embodiments to be presented in the following, will be described in greater detail by referring to the appended figures, wherein.

DETAILED DESCRIPTION OF THE INVENTION

Figure 1:
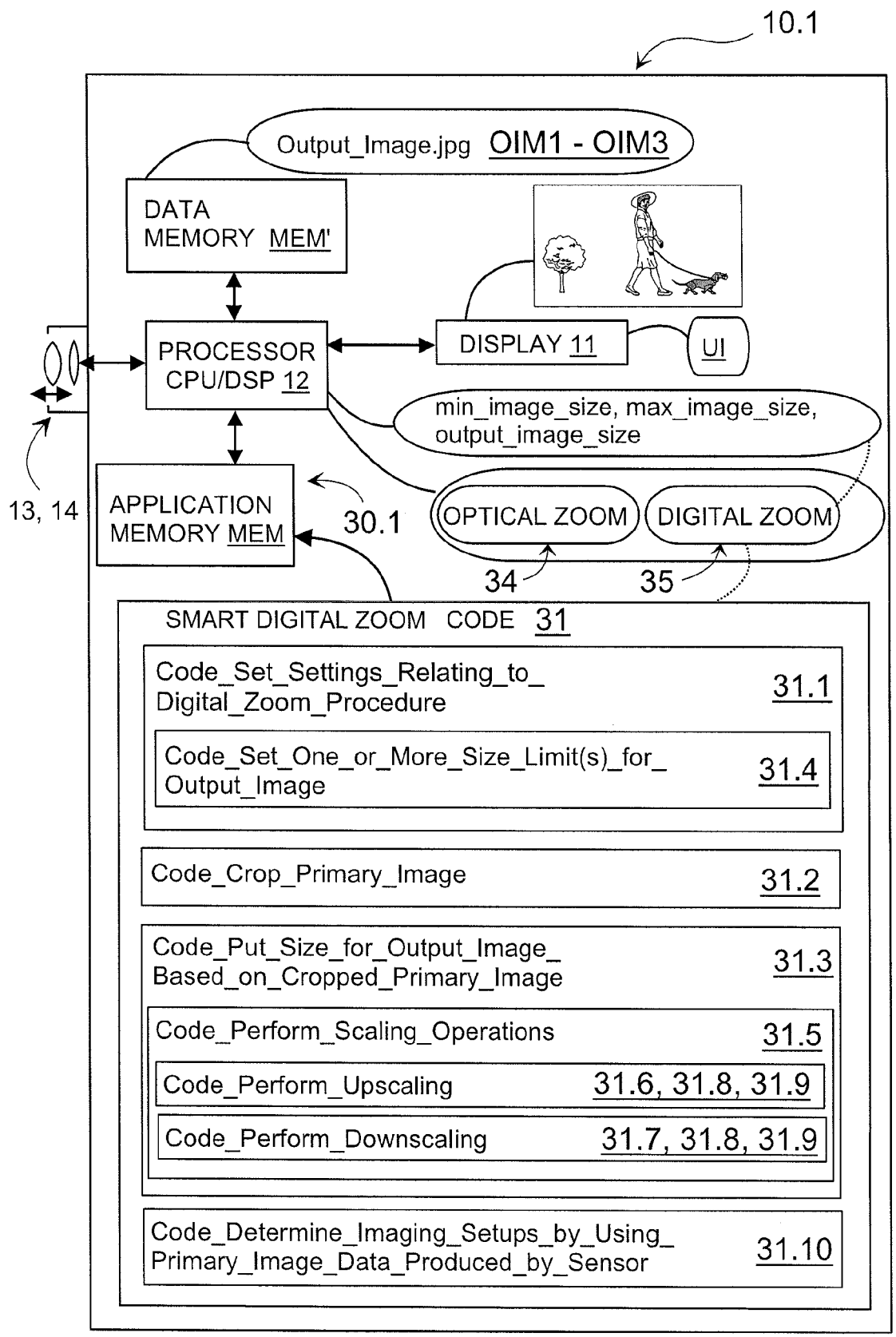
FIG. 1 is a rough schematic view of a basic application example of the first digital camera device and the first program product to be arranged in connection with the first digital camera device according to the invention.
Figure 8:
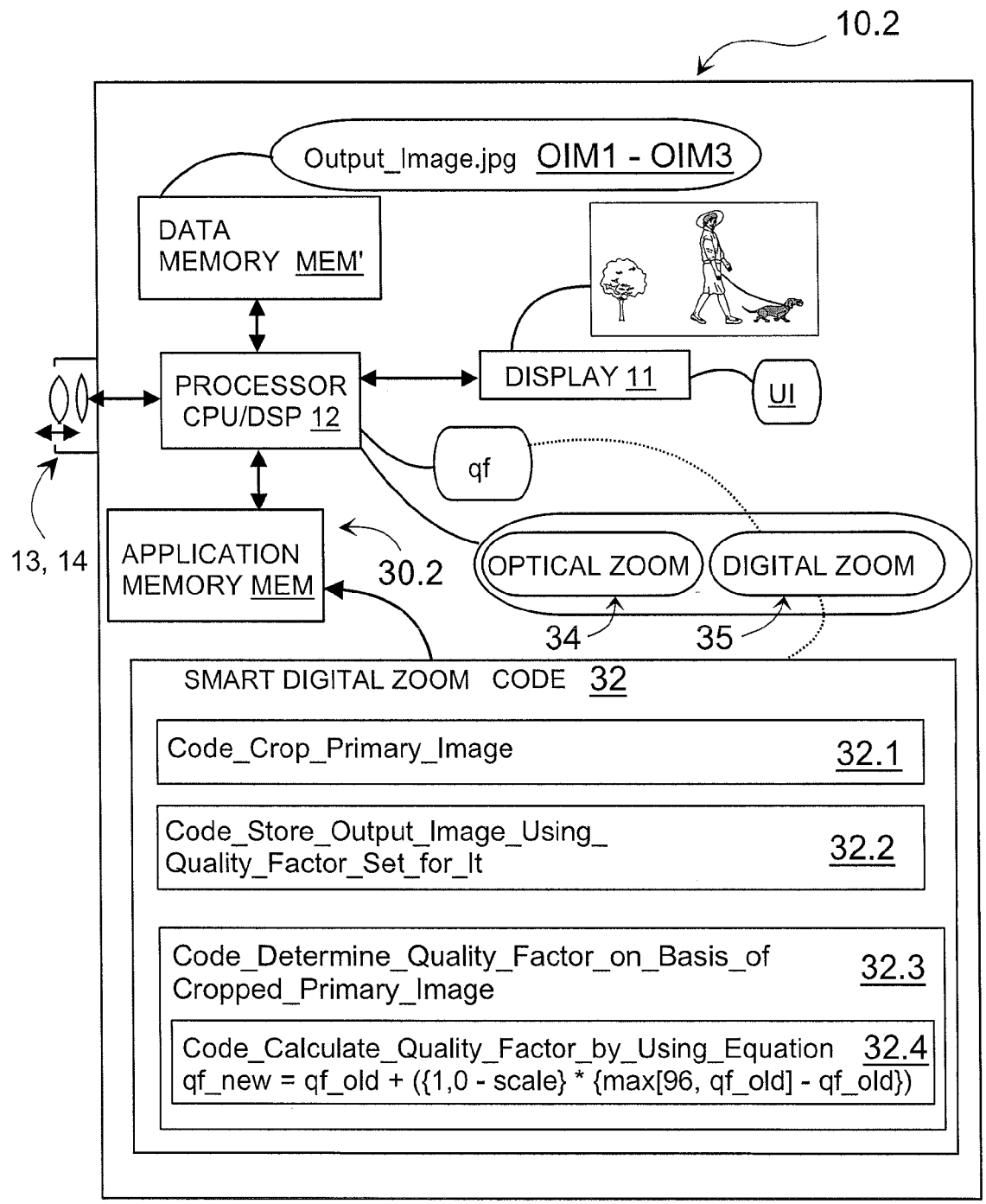
FIG. 8 is a rough schematic view of a basic application example of the second digital camera device and the second program product to be arranged in connection with the second digital camera device according to the invention.
Figure 10:
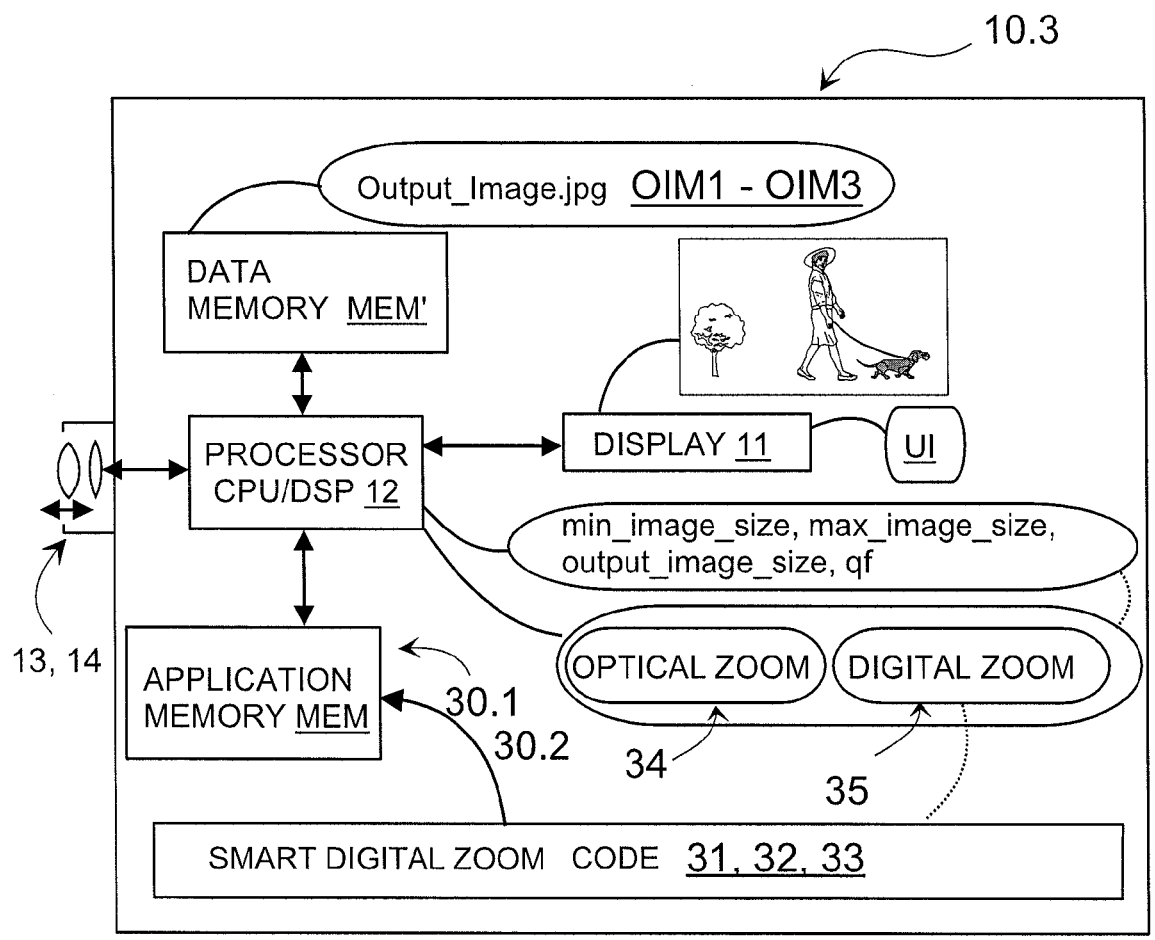
FIG. 10 is a rough schematic view of a basic application example of the third digital camera device and the third program product to be arranged in connection with the third digital camera device according to the invention that is a combination of the devices of FIG. 1 and FIG. 8.

FIGS. 1, 8 and 10 show some examples of portable digital camera devices 10.1-10.3 according to the invention. In general, the devices 10.1-10.3 according to the invention may be, for example, mobile devices, such as, for example, mobile phones, PDA devices (Personal Digital Assistant) or some equivalent intelligent communication devices ("smart device"). Of course, the devices 10.1-10.3 may also be digital cameras without any special communication features.

In their general form, the devices 10.1-10.3 may include a display 11 and an image processor means 12. The display may include a color display element 11, known as such (for, example, LCD or TFT), or corresponding means which can show (and allow for viewing of) images OIM1-OIM3 and through which the user interface UI of the device 10.1-10.3 may be used. The display 11 may also operate as a viewfinder, which the device 10.1-10.3 may have even several (optical and digital). In the viewfinder function, the display 11 may be used to view the imaging view in connection with the digital imaging when the image object is aimed with the device 10.1-10.3.

The image processor means may include one or several processor(s) unit(s) 12, or corresponding means by which the functions of the devices 10.1-10.3 are carried out in many relations. In connection with the invention, these measures are focused to the digital imaging, more particularly to the digital zooming procedure. The devices 10.1-10.3 may also have one or more memories MEM, MEM' which may store different kinds of data. Some examples of these are, output images OIM1-OIM3 that are produced by the device 10.1-10.3, and also program products 30.1-30.2. The products 30.1-30.2 are arranged in connection with the devices 10.1-10.2 in order to perform measures and operations according to the invention.

The digital camera devices 10.1-10.3 according to the invention have also a digital zoom function 35. The digital zoom function 35 may be used in order to form an output image OIM1-OIM3. The digital zoom 35 may be known as such but also included with the operations according to the invention described more specifically in below.

In addition, the devices 10.1-10.3 include also imaging means. These means may include a sensor 13 and optics 14. The sensor 13 may be known, as such, like the optics 14. The optics 14 may have means to adjust a focal length (optical zoom), but this is not necessary. By using the sensor 13 and the optics 14, a primary image PIM may be produced. Also these means 13, 14 are used to produce a viewfinder image to which cropping measures are pointed out when performing digital zooming.

Next the devices 10.1-10.3 will be described in a manner that is more focused to the invention. For the skilled person, it is well known that the devices 10.1-10.3 may also include other such functionalities, which are not required to be described in this application context in a more detailed manner. In addition, the function entities of the device 10.1-10.3 described hereinafter can, of course, take care out of many other matters and functions that which are considered to be relevant to describe, in this connection, in order to illuminate the basic idea of the invention.

For the skilled person it is obvious that at least part of the functions, operations and measures of the invention may be performed in a program level executed by the processor 12. Of course, such implementations are also possible in which at least part of the operations are performed on the program level and part of the operations are performed on the hardware level. The relevant points are referred to these program code means by means of which the device operations may be performed according to one embodiment.

Figure 2:
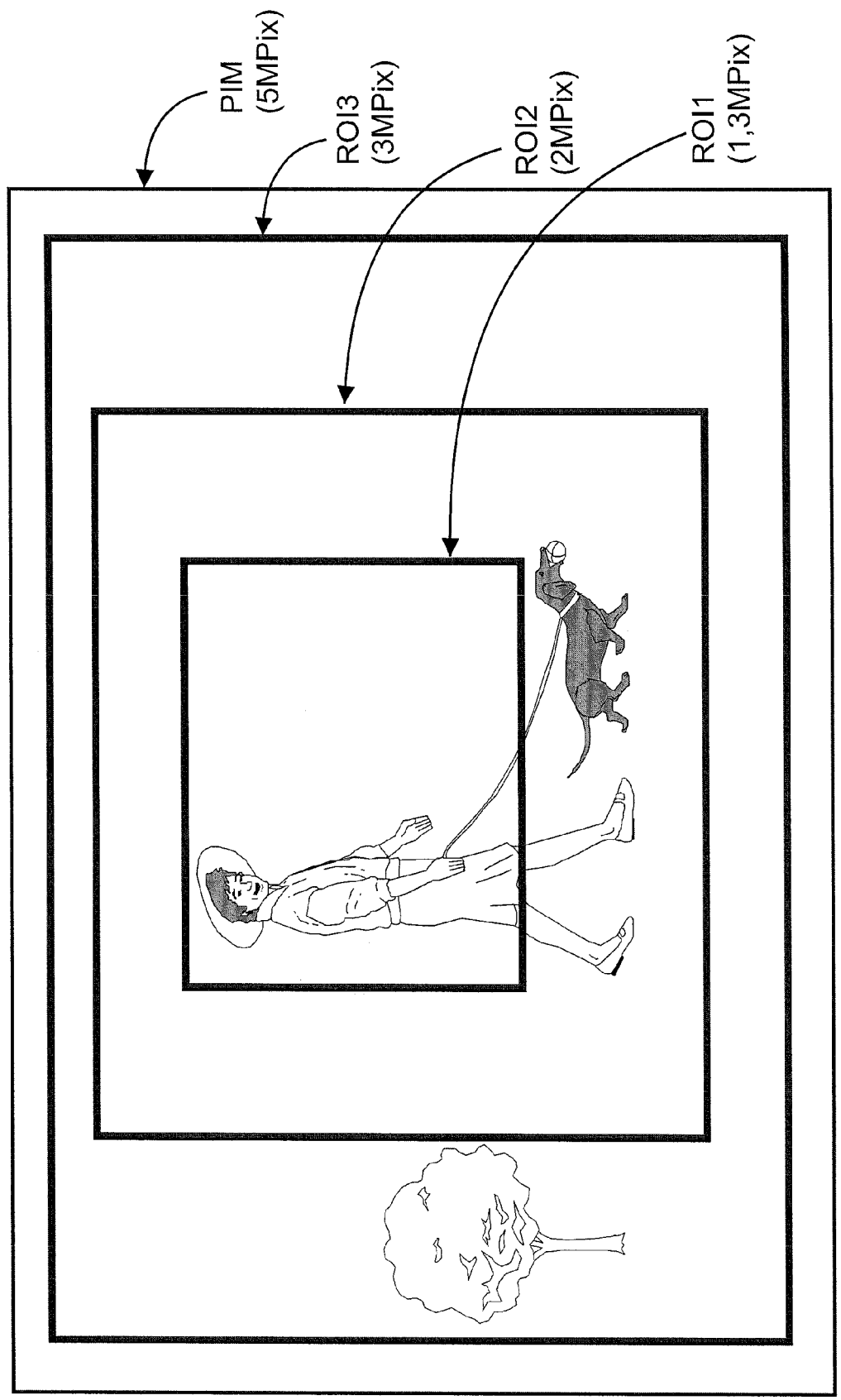
FIG. 2 shows some examples of cropping of a primary image in connection with the invention.

First a reference is made to the device 10.1 presented in FIG. 1 and digital zooming example presented in FIG. 2. The program code means 31.1-31.10 forming the program code 31 are also presented in FIG. 1.

As described above, the device 10.1 according to the invention includes also the display 11. The primary image PIM produced by using the imaging means 13, 14 is arranged to be cropped. The cropping operation is performed in connection with the digital zooming procedure when the selection of the ROI1-ROI3 in the primary image PIM showed on display 11 is performed in order to produce the output image OIM1-OIM3. The program code means 31.2 of the program code 31 may take care out of this measure.

In addition, the user interface (UI) of the device 10.1 is also arranged for setting one or more settings. The expression "user interface" is not intended to limit the invention in any way. The user interface may have different kinds of forms, for example, a collection(s) of buttons and/or (rotation) switches and/or only elements presented on the display 12 which are controlled by the control means (of known kinds of user interfaces) or in any other suitable manner. The settings may relate, among others, to the digital zooming procedure intended to be performed. The program code means 31.1 may take care out of this measure in a well-defined manner.

The basic idea of the invention is that, for example, the device 10.1 is configured for setting one or more size limits for the output image OIM1-OIM3 (that is intended to be produced as the result of the digital imaging) via the user interface UI of the device 10.1. The program code means 31.4 may take care out of these measures.

In the invention the image processor 12 is arranged to set a size for the output image OIM1-OIM3. That is carried out based on the performed cropping of the primary image PIM. The size adjustment that is defined by the size limits is performed based on, at least in part, the digital zoom range. The program code means 31.3 may take care out of this measure.

In particular, the general idea of the invention is that it sets the size for the output image OIM1-OIM3 (in a "smart" way). In the device 10.1, an algorithm code 31 is used that checks how the area ROI1-ROI3 that is cropped in the primary image PIM relates to the one or more size limits put in the UI. The size of the output image OIM1-OIM3 is then set based on the one or more size limits, and also based on the size of the cropped primary image area ROI1-ROI3. When the image processor 12 observes that the sizes and limits set for them relate to each other in a certain manner, it decides if scaling operations needed. These scaling operations may be upscaling (being different kind of interpolation methods) and downscaling. Scaling operations are performed based on, at least in part, the digital zoom range. The digital zoom range in which the scaling operations are performed is defined by the one or more size limits that have been set via the user interface UI. The program code means 31.5 may take care out of these measures. Owing to the invention, the user need not further select lower resolution than original_sensor_resolution to be the output_resolution. Thus, the output_resolution is decided in a "smart" way.

Next the invention is described in the case of JPEG images. However, the invention does not exclude other image formats to be applied, but one versed in the art may adapt the invention to other image formats too. A reference is made to the FIG. 2. That describes different kinds of cropping ROI1-ROI3 pointed out to the primary image PIM and from which the output images OIM1-OIM3 are produced. The reference is made to FIG. 2 when describing different method options below.

Figure 3:
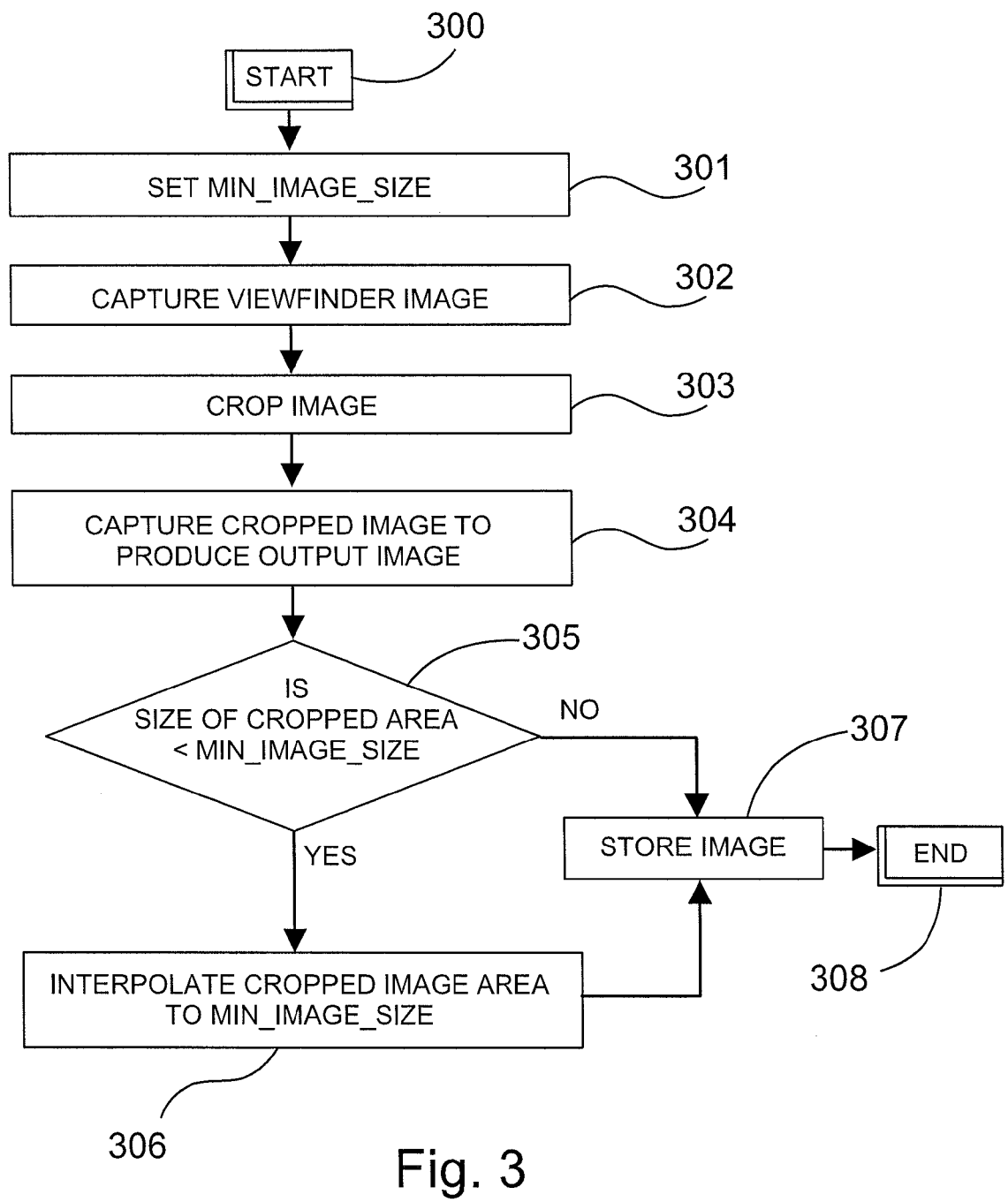
FIG. 3 shows a flowchart of the first application example of the first method when performing digital zooming procedure.

Next a method of a digital zooming procedure 35 in order to form an output image OIM1-OIM3 is described in connection with different embodiments. In the first and second embodiments, only one size limit is applied in both cases. FIGS. 1, 2 and the flowchart of FIG. 3 are referred to in the case of the first embodiment of the invention. FIG. 3 is described in a detailed manner. Descriptions of the other flow-charts are provided for only the parts that differ from the embodiment of FIG. 3.

In FIG. 3, as a first step 300 the user of the device 10.1 starts the imaging procedure according to the invention. In stage 301 the user has an option to set one or more settings relating to the digital zoom function 35, which is possibly needed in connection with the imaging. These settings may be set via the user interface UI of the device 10.1. There may be even several settings that may be set in this stage 301, not only the setting(s) according to the invention. The settings may be set also in that case, for example, if the digital zoom function is not even activated then the optical zooming 34 may be enough for performing an imaging operation.

The settings that may be set in this connection are one or more size limits for the output image OIM1-OIM3. In this embodiment the size limit according to the invention is a minimum size min_image_size for the output image OIM1-OIM3 that is intended to be produced in the method. The size limit min_image_size may be expressed, for example, as a megapixel value. Now this exemplary value may be, for example, 1.5 Mpix. In the embodiments, the sensor 13 may have a total resolution that is, for example, 5 Mpix. One should also understand that these values hereinafter are only intended to be examples, so they are not intended to limit the invention or its adaptation to some special purpose.

The processor 12 registers this setting min_image_size and stores that to the memory MEM' of the device 10.1. After this, the setting min_image_size set by the user in stage 301 may be used in connection with the digital imaging, even if the device 10.1 would be switched off between imaging measures. So for example, this setting min_image_size may be like one of the current settings widely used in camera devices. The setting value min_image_size may be stored as a default value to the settings until that is changed the next time by the user. These aspects relate also to other settings of the invention described hereinafter.

The setting relating to the min_image_size and size limits according to the invention in general may be set by using the predefined list presented in the UI. There may be also assist information relating to different values, which helps in user selection. In this kind of list, some minimum sizes for the output image OIM1-OIM3 may be presented, one of which being set by the user. Of course, the user may also set a size value that has been decided by him. Then the min_image_size may be set to be any size. Size values may be also other values, for example, the integer Mpix size values. The size value scale may also change smoothly.

In stage 302 the user of the device 10.1 sights the image objects with the camera device 10.1. In stage 302 the continuous viewfinder imaging is performed and this provides for the primary image PIM to be produced. Because of that, the primary image PIM captured by sensor 13 and optics 14 is shown on the display 11.

If the circumstances (for example, the distance between user and the aimed image objects) are such that the user wants to crop the image area of the primary image PIM, he may perform a zooming procedure. If the camera device 10.1 has the optical zoom function 34, the user may utilize it in a desired manner as in stage 303. The optical zoom function 34 may be adjusted to its telephoto position or to any other suitable position in order to crop the image object in a desired manner. If the telephoto position is used, the optical zoom 34 is in its maximum level. The primary image PIM for the viewfinder 12 is then produced by using this optical zoom function 34.

If the user still wants more cropping of the view (i.e. the region of interest ROI1-ROI3 is in "deeper", in the primary image PIM), he may use the digital zoom 35 of the device 10.1. This is performed also in stage 303. The user interface UI may be designed so that the digital zoom 35 is activated when the user tries to zoom further than what the optical zoom 34 allows. The user may go further from this maximum optical zoom adjustment. Also, in certain implementations the digital zoom 35 may be activated even though the optical zoom 34 isn't in an extreme telephoto position. The viewing area ROI1-ROI3 that is cropped may be surrounded in the viewfinder screen 11 by using, for example, a rectangular or other border as is presented in FIG. 2. This may be used to indicate for the user that the digital zoom 35 is activated now. The user continues the cropping (i.e. digital zooming procedure) until the desired area is reached in the viewfinder display 11.

One should understand that only one cropping ROI1, ROI2 or ROI3 may be presented in the viewfinder 11 at a time. The image objects in the bordered area ROI1-ROI3 forms the image objects that will come to the output image OIM1-OIM3. The surrounding areas that are outside of the borders ROI1-ROI3 may be discarded. This procedure is well known in digital zoom implementations.

When the border frames are around the subject in the desired manner (i.e. the region of interest ROI1-ROI3 has only the desired image objects), the user presses the shutter button to capture the final primary image PIM from which the device 10.1 produces the output image OIM. The processor 12 recognizes the cropped area ROI1-ROI3 of the primary image PIM and inputs only this data for the further processing and storing. This is performed in the stage 304.

In stages 305 and 306, possible scaling operations may be performed, which is now based on the one size limit min_image_size and also on the size of the cropped area ROI1-ROI3 of the primary image PIM.

In stage 305 the cropped sub-images ROI1-ROI3 are taken into the processing that is performed in the manner according to the invention. Now the size for the output image OIM1-OIM3 that is intended to be stored or to route further processing, for example, at somewhere else, is set on the basis of the cropped area ROI1-ROI3 of the primary image PIM. This size adjustment may be performed based on, at least in part, on a digital zoom range. The range, in which this is performed, is now in this embodiment defined by the size limit value min_image_size defined in stage 301. So, in this embodiment the digital zooming range may be divided into two sub-ranges, one range in which scaling measures have been performed, and another range in which any scaling measures have not been performed.

If the processor 12 determines that the condition of stage 305 is true, i.e. the size of the cropped image area ROI1 (=1.3 Mpix) is now less than the set size limit min_image_size (=1.5 Mpix) then the step to stage 306 is performed. Thus, the digital zoom factor is too high for that which was intended in stage 301. In stage 306 the image processor 12 upscales the cropped image area ROI1 of the primary image PIM to this minimum size min_image_size (=1.5 Mpix) set for it in order to produce the final output image OIM1. The program code means 31.6 may take care out the analyzing if the size of cropped primary image is below the minimum size min_image_size and the interpolating (stages 305 and 306).

However, if the size of the cropped image area ROI2, ROI3, i.e. the digital zoom factor is such that the condition in stage 305 is untrue, this is also recognized by the processor 12, the step of stage 307 is then performed. There the captured and cropped image ROI2 (=2 Mpix) and ROI3 (=3 Mpix) is then stored or further processed without any scaling measures. The program code means 31.3 performs this. So to say, the cropped image area ROI2, ROI3 without any measures that relate to scaling, forms then the desired output image OIM2, OIM3. Thus, the size of them will be, in that case, more than the minimum image size limit min_image_size set for produced output image. The imaging procedure ends to stage 308.

The stage 307 in this embodiment and the corresponding stages in other embodiments, too, may include the JPEG encoding process. In the invention, this JPEG coding process is performed after the possible scaling measures. Owing to this is an achieved appropriate order to perform scaling and coding measures.

The embodiment above can be used, for example, in such case if the user knows that he is going to print the images in a certain resolution, and he wants that the camera 10.1 does the required interpolation. The user could also use the size limit min_image_size to make the digital zoom 35 operate in the traditional way by setting min_image_size=max_image_size, if the user so desires. The application example of a maximum image size max_image_size is described next.

Figure 4:
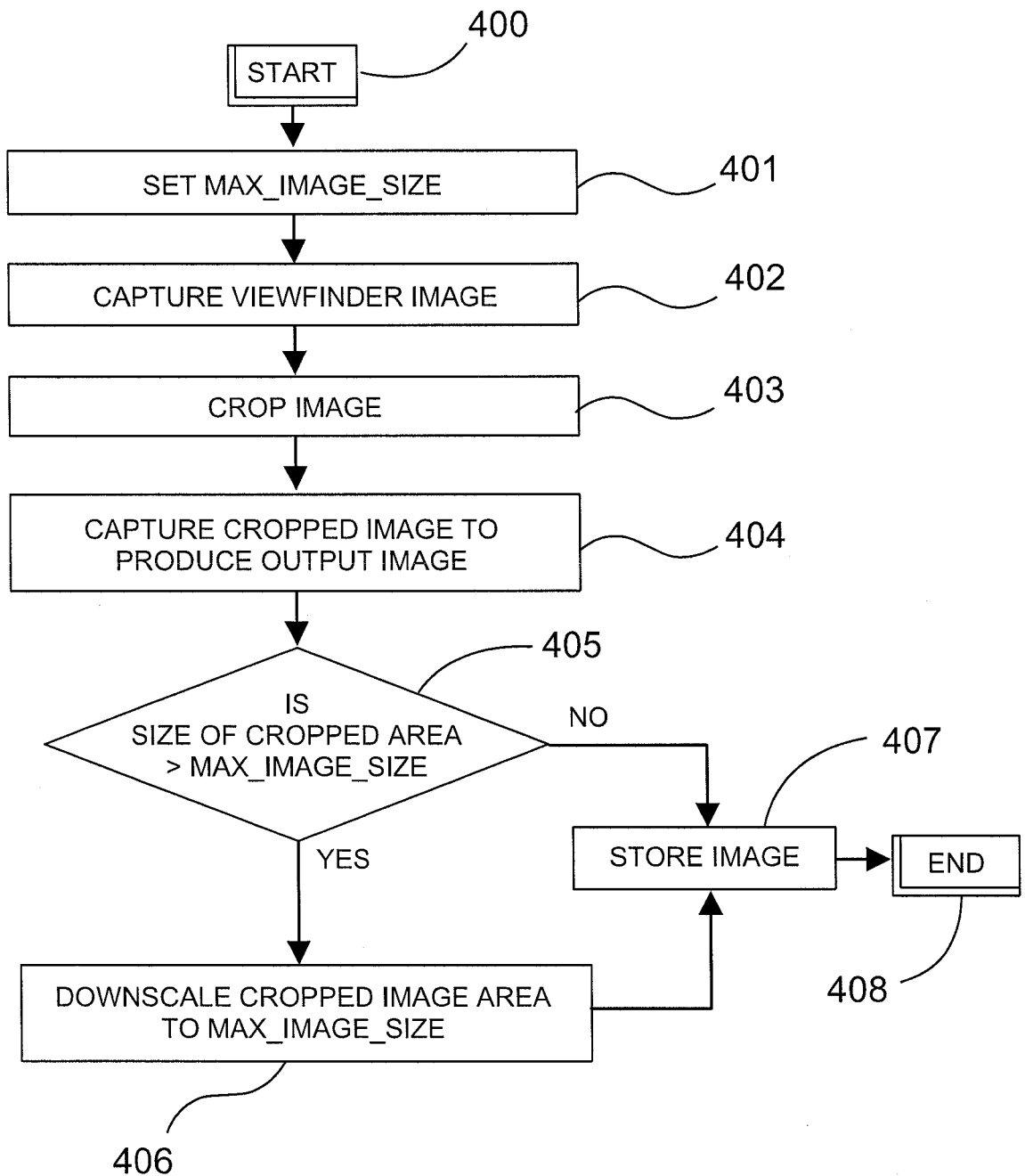
FIG. 4 shows a flowchart of the second application example of the first method when performing digital zooming procedure.

FIG. 4 describes another embodiment in which the use of one other setting (other than the minimum image size min_image_size) is described. In this embodiment the stages 400-404 may be equivalent with the corresponding stages 300-304 of FIG. 3. Also, other stages, which don't considerably differ from the performed measures of FIG. 3, are not described hereinafter in any more detail. The only exception when considering these stages 400-404 is, now that in stage 401 instead of the minimum image size min_image_size or image sizes in the sense of invention in general, the maximum image size max_image_size for the output image OIM1-OIM3 is set as the one or more size limits according to the invention. This maximum image size value max_image_size may now be, for example, 2.5 Mpix. This may also be set in the user interface UI of the device 10.1.

The above means provides for the output image (produced by digital zooming procedure 35) that will have the size max_image_size, between the zoom factor [no digital zoom used, max_image_size]. The final size of the output image will be smaller than the set max_image_size, if the digital zoom is used in such amount that the size of the cropped area is smaller than the maximum image size max_image_size set for it.

In stage 405 the processor 12 is again used to determine if the size of the cropped image area ROI1-ROI3 exceeds the maximum size max_image_size (=2.5 Mpix) that was set for it in stage 401, or picked up from the memory MEM' of the digital zoom function 35. If the condition of stage 405 is true, that it is in the case of ROI3, the step to stage 406 is then performed.

In stage 406 the image processor 12 downscales the cropped area ROI3 of the primary image PIM to this maximum size max_image_size set for it. The program code means 31.7 may take care out of this measure. Also, the downscaling methods applied herewith are well known for the skilled person, and because of that, there is no need for their detailed description.

If the condition evaluated in stage 405 is untrue, that is now in the cases of ROI1 and ROI2, the step to stage 407 is then performed. The size of them will remain, corresponding the effective cropped area, and the output image OIM1, OIM2 has the sizes 1.3 Mpix and 2 Mpix. Other steps 407-408 may correspond to the steps 307-308 described in connection with the embodiment in FIG. 3.

In this embodiment the cropping stage 403 may also be optional. If no cropping is performed in stage 403, then the captured image PIM may also be downscaled to the max_image_size. This non-cropping feature may also be applied in other embodiments, too. If the user wants the output images with the nominal resolution of the sensor 13 (for example, 5 Mpix), he may set in UI max_image_size=sensor_size.

Figure 5:
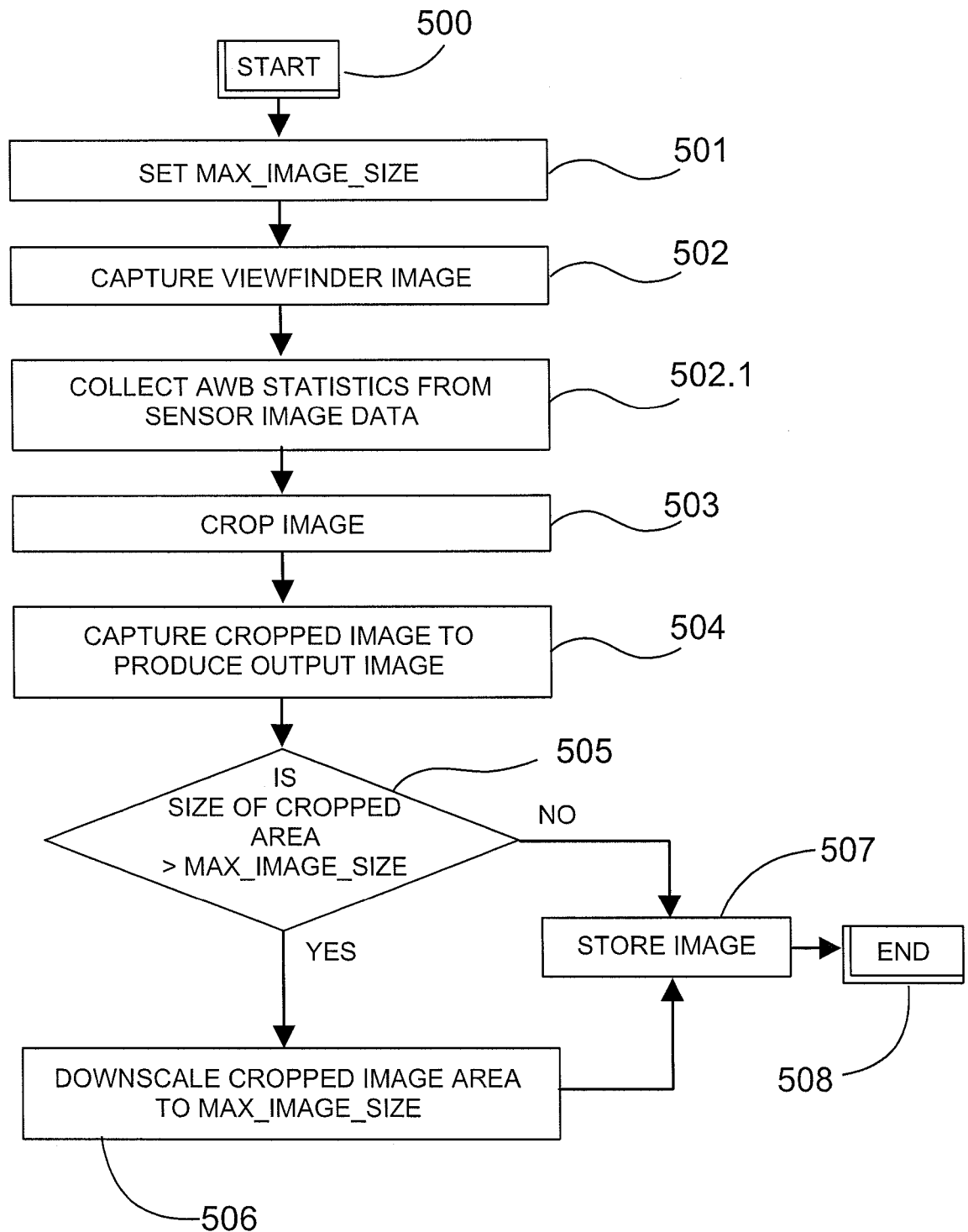
FIG. 5 shows a flowchart of the third application example of the first method when performing digital zooming procedure.

In FIG. 5 is described the embodiment which mainly corresponds the embodiment described in FIG. 4. However, this embodiment illustrates that the data of the primary image PIM produced by sensor 13 and optics 14 may be used to determine some imaging setups. The program code means 31.10 may take care out of this measure.

Here in stage 502.1, this whole amount of the primary image PIM data produced by the sensor 13 is collected in order to adjust, for example, the white balance of the final output image OIM1-OIM3. This collection of AWB statistics may be performed in connection with the viewfinder stage 502 in which the imaging is performed by using the sensor 13. Although, in the resulted output image, OIM1-OIM3 will only have the data that is received due to the cropping procedure (i.e. the data of the region of interest ROI1-ROI3), and the whole area of the primary image PIM (=5 Mpix) captured and viewed by the sensor 13 is used to determine the AWB correction. Any kind of methods may also be utilized in the AWB. The set of AWB will be carried out before any possible scaling operations are performed (i.e. in this embodiment before stage 506). Of course, the other embodiments presented above and below may also utilize the collecting of AWB statistics performed in this embodiment.

Figure 6:
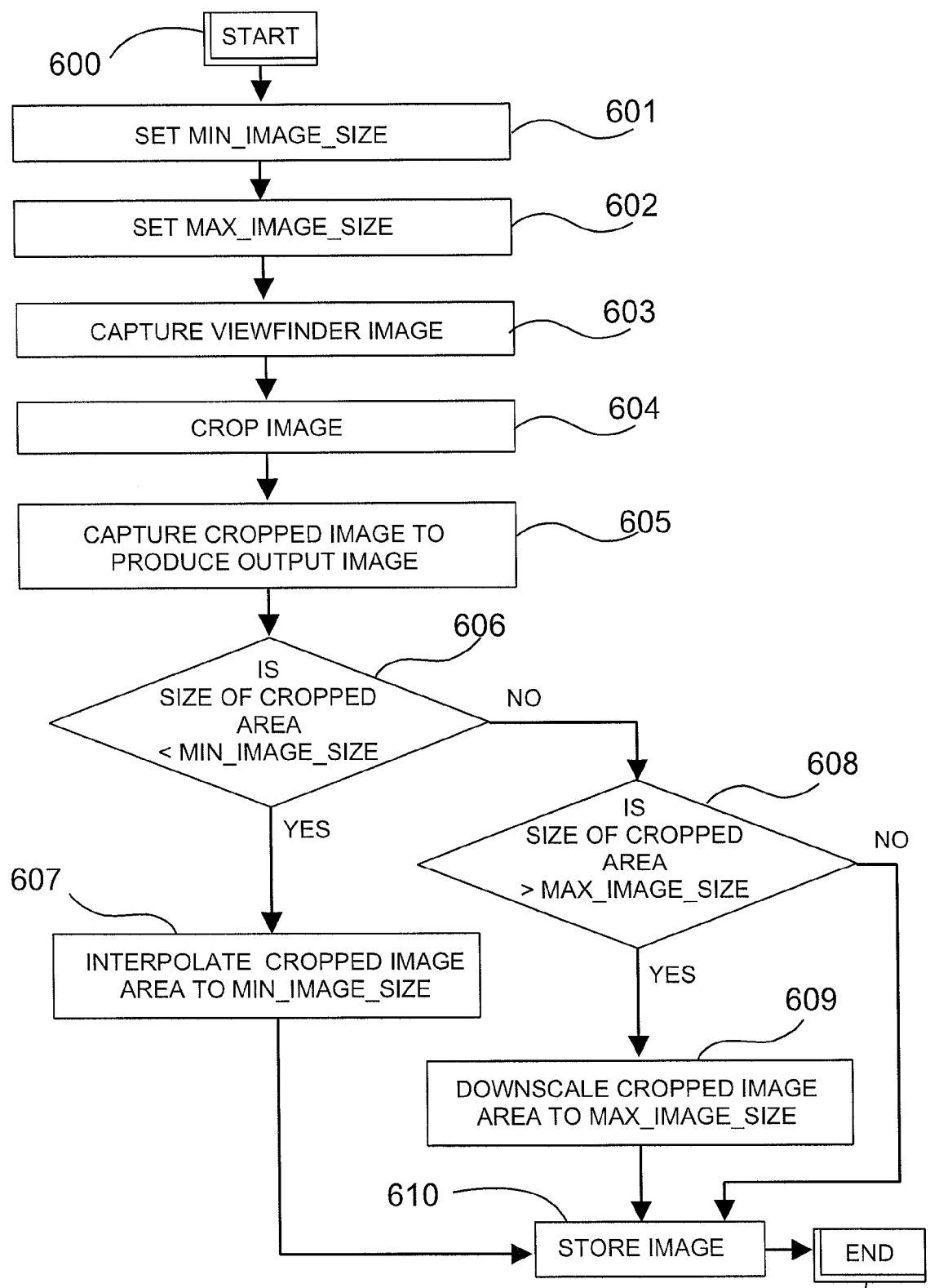
FIG. 6 shows a flowchart of the fourth application example of the first method when performing digital zooming procedure.

FIG. 6 presents the embodiment in which the embodiments described in FIGS. 3 and 4 are combined to be one unified procedure. The descriptions of these embodiments above are valid in their appropriate parts. Applied here are the size limits in the meaning of the invention for the output image OIM1-OIM3 other than the minimum image size min_image_size and in addition to the maximum image size max_image_size.

These values are again set in stages 601 and 602 and they may be, in this application example, the same that was used in embodiments above (1.5 Mpix, 2.5 Mpix). This setup may also be performed in the user interface UI of the device 10.1. In this embodiment the area of the digital zoom factor between which the method according to the invention is applied is after the image size of the minimum image size (YES path of stage 606) and prior to the image size of the maximum image size (YES path of stage 608). If the cropped image size (ROI1, 1.3 Mpix) that the user intends to be the output image OIM1 is determined (in stage 606) to be less than the size limit min_image_size (=1.5 Mpix) set for it, upscaling (i.e. interpolation measure) is then performed in stage 607. If the cropped image size (ROI3, 3 Mpix) that the user intends to be the output image OIM3 is determined (in stage 608) to be more than the size limit max_image_size (=2.5 Mpix) set for it, a downscaling measure is then performed in stage 609. The program code means 31.8 may take care out of these measures and analysis.

If the size of the cropped area ROI2 that is intended to be the output image OIM2 is in the digital zoom factor range that is between the maximum image size max_image_size and the minimum image size min_image_size (i.e. NO path of stage 608), there are no performed measures for the cropped area ROI2 relating to upscaling or downscaling. After the storing stage 610, imaging and zooming procedures for the image in question are ended (stage 611).

Figure 7:
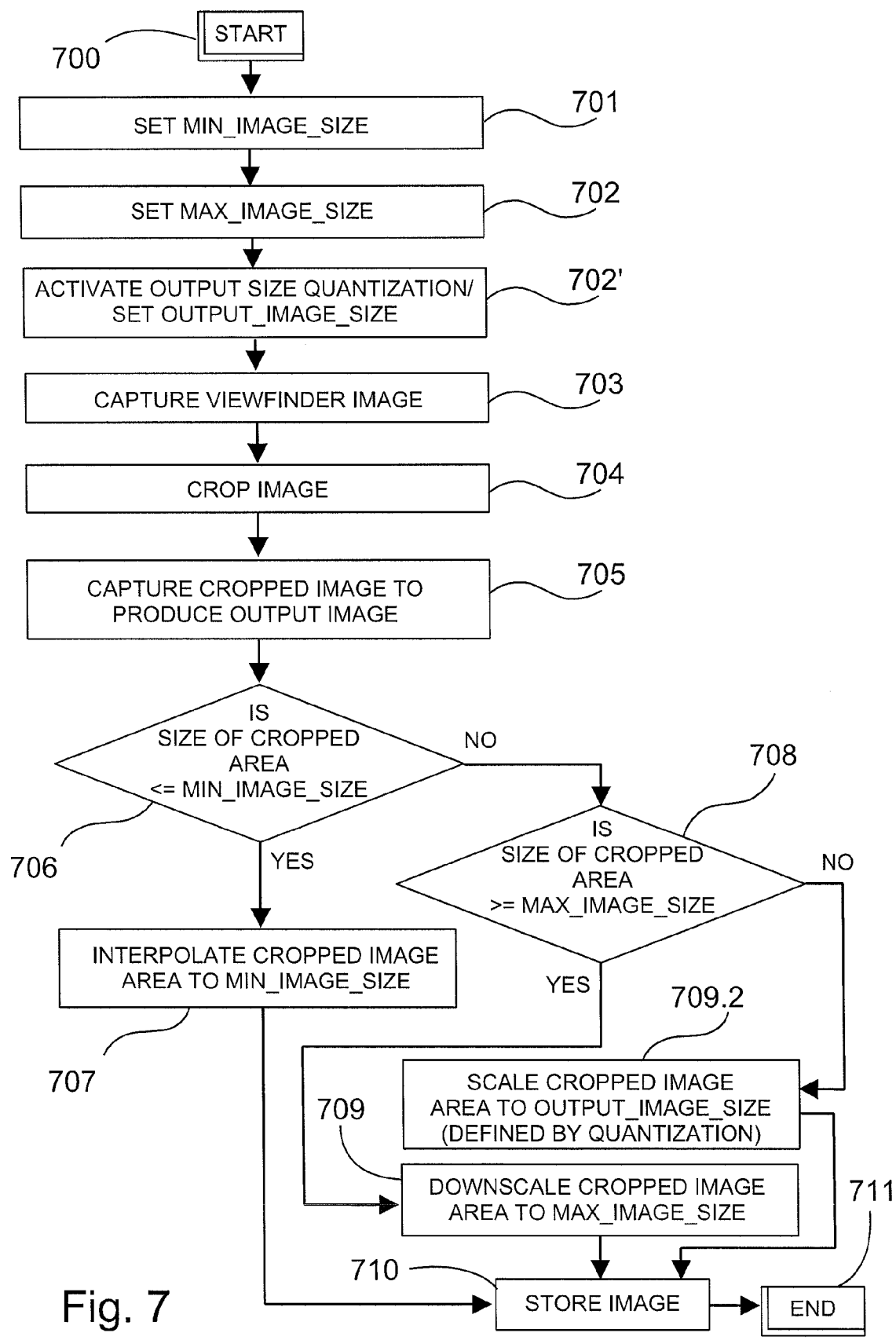
FIG. 7 shows a flowchart of the fifth application example of the first method when performing digital zooming procedure.

The embodiment in FIG. 7 corresponds otherwise to the embodiment presented in FIG. 6, but here also the size limits include, in addition, at least one output image size output_image_size for the output image intended to be produced. The size limit for the maximum image size max_image_size may now be, for example, 4 Mpix and the size limit for the minimum image size min_image_size may now be, for example, 0.3 Mpix (=VGA resolution). The size limit for the output size limit output_image_size may now be in this exemplary case, for example, 3.2 Mpix. Alternatively, this output size limit may also be a set of some general used resolutions (for example, 4 Mpix, 3.2 Mpix, 2 Mpix, 1 Mpix). In this embodiment the nominal resolution of the sensor 13 may be, for example, 5 Mpix. According to this embodiment the user will achieve only such output images for the sizes desired. The program code means 31.9 may take care out of operations relating to this output image size measure set.

According to a first aspect of this embodiment, if such a setup is performed for the size limits that the minimum image size min_image_size is set to be very small, for example, 0.3 Mpix, and the maximum image size max_image_size is set to be very large, for example, 5 Mpix, all images are then generated to the set output image size output_image_size 3.2 Mpix.

The size limit setting for the output image size output_image_size may be now set in stage 702'. If the predefined set of the output image size limits (for example, 4 Mpix, 3 Mpix, 2 Mpix, 1 Mpix) are applied, then in this stage 702' it is possible to select a special imaging mode relating to the digital zoom function 35 that is now expressed as a "quantized output size mode". In general, the digital zoom range between the set minimum size limit (min_image_size) and the set maximum size (max_image_size) limit in this mode is quantized by the set output image size limits, on the basis of which the size for the cropped primary image is set in an established manner. According to this mode the user doesn't need to set every image size between size limits max_image_size and min_image_size that he or she desires but the image is scaled to one of the predefined image sizes based on an established criteria. This selection reduces the amount of selections needed to be performed in the user interface (UI).

If in stage 708 it is determined by the processor 12 that the cropped size (i.e. the size of the region of interest ROI2 of the produced primary image PIM) is between the size limits min_image_size and max_image_size, then a step to stage 709.2 is performed. There the image processor 12 scales the cropped area ROI2 (=2 Mpix) of the primary image PIM to the set output image size output_image_size. This scaling measure is performed in an established manner.

The scaling measure may be implemented to be in such a manner, for example, that between the size range (3.2-4] Mpix the size of the output image is to be 4 Mpix and between the size range (2-3.2] Mpix the size of the output image is to be 3.2 Mpix and between the size range (1-2] Mpix, that is the case in ROI2 the size of the output image is to be 2 Mpix etc. In these cases, the cropped primary image is thus interpolated. Of course, the implementation may also be instead provided for the embodiments presented above (i.e. instead of the interpolation, the decimation would be performed as a scaling measure). In such an embodiment, for example, the cropped primary image between the size range (3.2-4] Mpix would be decimated to be 3.2 Mpix etc. This quantization embodiment allows for producing such output images which don't have arbitrary sizes, but the size that is the most common size being nearest for the cropped image area.

So, in this stage 709.2 both the downscaling and also the upscaling measures are possible to be performed, which depends on the relation of the size of the ROI and the output_image_size, and also the implementation of this quantization embodiment. Otherwise the procedure may be mainly carried out like in the embodiments described above. It should also be noticed in connection with this embodiment of FIG. 7 that if the size of the cropped image area is precisely the size set for the size limits, i.e, max_image_size or min_image_size, then the stages 707 and 708 are performed without any interpolation or decimation measures.

Of course, such an embodiment is also possible, in which there are no applied size limits relating to the maximum and minimum size, but only the set size for all output images that are intended to be produced. In that case the measures, which are carried out may depend on the sizes of the regions of interest ROI1-ROI3. If the size of the cropped area (i.e. in cases of ROI1 and ROI2) goes below the set size for the output image, then interpolation measures are performed (i.e. new pixels are created in a well-known manner). If the size of the cropped area (i.e. in the case of ROI3) exceeds the set size for the output image, then downscaling measures are performed. Of course, if the size of the cropped area would be just precisely the size of the set output size, then no measures are required. This is obvious for the other embodiments, too.

In FIG. 8 is described another embodiment of the device 10.2 according to the invention. Mainly the functional entities of that have been defined in appropriate level in connection with the description of FIG. 1. The device 10.2 is equipped with a program code 32 that may take care out of the required operations.

Also, in this embodiment the digital camera device 10.2 has functionality in order to carry out the digital zoom function. This is intended to form an output image. The device 10.2 includes, besides the functions and entities described in connection of FIG. 1, also a user interface entity UI and a processor entity 12. In the user interface UI the primary image produced by sensor 13 is cropped in connection with the digital zooming procedure in order to form the output image. This may take care out of by program code means 32.1. The image processor 12 stores the output image by using a quality factor qf set for it. This may take care out of by program code means 32.2.

In the device 10.2 according to the invention, the quality factor qf is surprisingly connected to the size of the cropped primary image area i.e. to the size of the region of interest about which the final output image is intended to be produced. The measures relating to this may take care out of by program code means 32.3.

Figure 9:
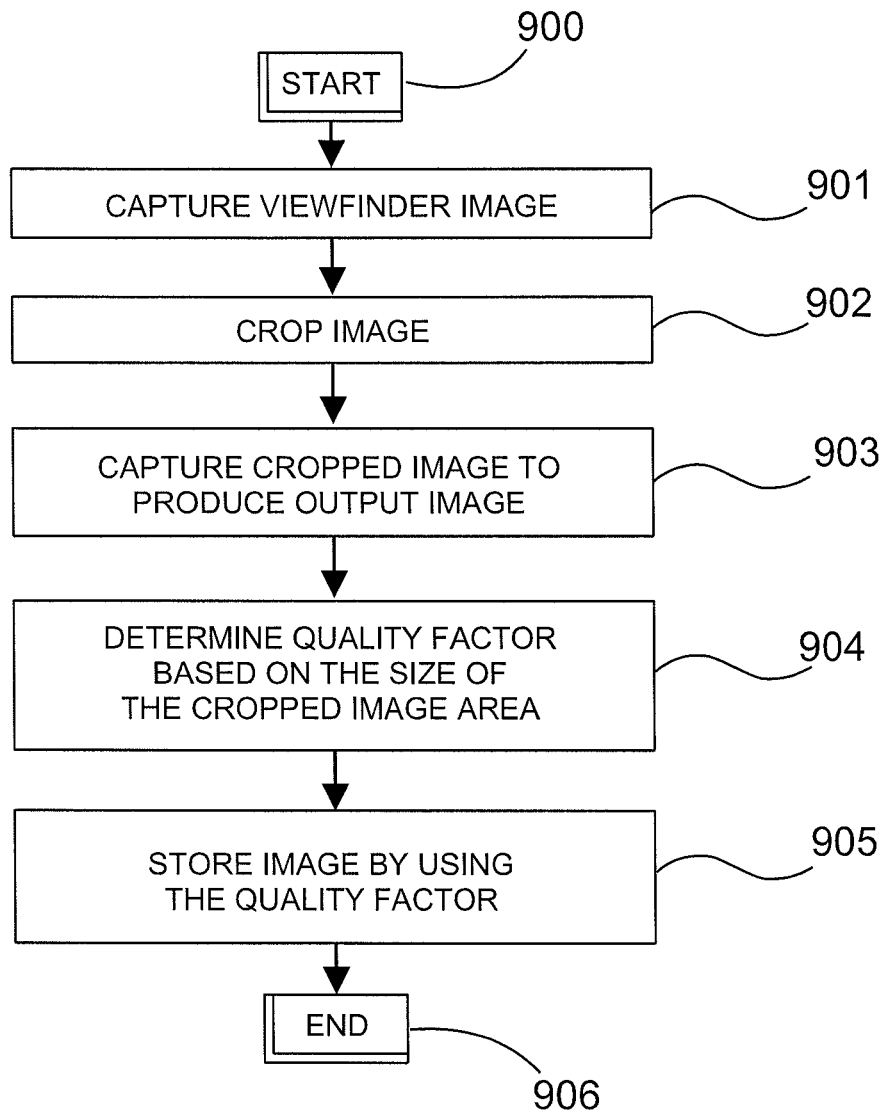
FIG. 9 shows a flowchart of the first application example of the second method when performing digital zooming procedure.

In FIG. 9 is described one example of a method of a digital zooming procedure in order to form an output image. This method may be implemented by using the device 10.2 described in FIG. 8. Here the stages 900-902 may correspond to measures already described in the embodiments presented prior to this embodiment. These stages may include viewfinder imaging (stage 901), cropping of the viewfinder image (stage 902) and capturing the cropped image in order to produce the output image (stage 903).

After stage 903 is performed, the quality factor qf is determined for the captured and cropped image (stage 904). The quality factor qf is now determined surprisingly on the basis of the size of the cropped image area. The sizes may be, for example, megapixel values, as presented already in embodiments above. Thus, the size may be understood as a resolution of the image. This procedure is carried out, for example, in such a manner that the size of the cropped image area is first determined by the processor 12.

The quality factor may be calculated, for example, by using the equation of:

$$qf\_new = qf\_old + (\{1,0-scale\} * \{max[96, qf\_old] - qf\_old\}).$$

In that $$scale = (crop\_xsize/original\_xsize) * (crop\_ysize/original\_ysize).$$

In that qf_new=new quality factor, qf_old=old quality factor, crop_xsize=size of ROI in vertical direction crop_ysize=size of ROI in horizontal direction and original_xsize, original_ysize=size of primary image produced by sensor in the horizontal and in the vertical direction. The device 10.2 may be equipped with the program code means 32.4 that takes care out of these calculations. The file size of the cropped image is smaller than the file size of the cropped and interpolated image, even if the JPEG quality factor qf is increased considerably for the cropped image.

In stage 905 the captured and cropped output image is stored using a quality factor set for it (program code means 32.2).

The applying of the quality factor qf in connection with JPEG coding is obvious for the man skilled in the art. As is known, the JPEG encoding may be based on an 8×8 discrete cosine transform (DCT). The quality factor qf is used to adjust the values of the quantizing matrix, that is after the DCT conversion (=64 values). The quantizing matrix may be calculated prior to the coding by using the value of the quality factor qf.

When the values of the divisors being stored in the matrix grows, that may cause the greater portion of the values of the DCT quantizes to zero. This may cause the size of the output image (to be stored) to decrease, and at the same time, the quality becomes poorer. In the application embodiment described above, the greater value of the quality factor qf (near to 100) means the lesser values for the divisors in the matrix. This causes better quality for the image. When the value of the quality factor approaches zero, the values of the divisors becomes greater. The effect in the quality of the output image is opposite.

In image processing software, the quality factor may be defined by using the name "compressing factor". In these cases the function is right contrary. It should also be understood that the JPEG file in connection with the image data may also be stored to the used quantisizing matrix, and not the actual quality factor qf at all. Afterwards; by using the quantisizing matrix, the used quality factor qf may then be estimated. The JPEG standard presents a certain basic matrix which represents the quality factor value qf=50. However, if the user wants to select his matrix in some other manner, that is also possible.

The quality factor qf=100 means that all divisor values of the matrix are one, and thus DCT converted value is cut off to the integer precision (in that case the image is compressed a little bit).

If the whole process is described block by block: An 8×8 image block is taken from the image→DCT conversion is pointed out to the image block→the converted values are quantisized by using the quantisizing matrix→the quantisized values are coded by using the zigzag scanning and variable length coding. Nevertheless, the basic theory of the JPEG processes are apparent for the man skilled in the art and this background information presented above is not intended to limit the methods according to the invention in any manner. In general, the JPEG processing steps are included in the stages 307 (and other corresponding storing stages in the other embodiments).

The quality factor qf is the input parameter for the JPEG encoder when the output image intended to be stored is compressed to JPEG format. If the JPEG compression quality factor qf is not increased for the cropped images, the compression artifacts might become disturbing if the image is later interpolated into considerably bigger resolution.

Figure 11:
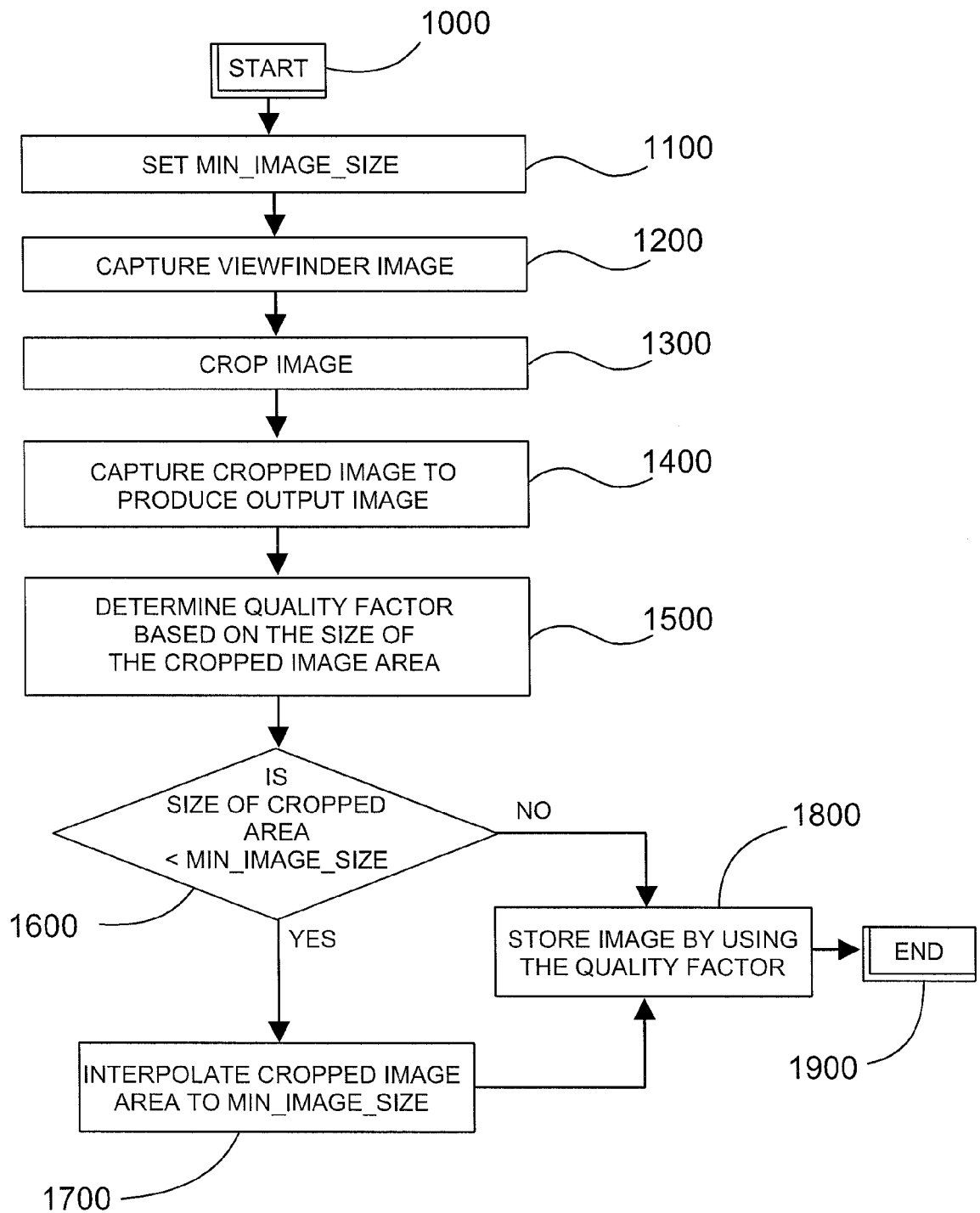
FIG. 11 shows a flowchart of the application example of the third method when performing digital zooming procedure and FIG. 12 shows a flowchart of the application example of the fourth method when performing digital imaging procedure.

FIG. 10 describes a third example of the device 10.3 according to the invention, and in FIG. 11 a flowchart relating to this device 10.3. Now the methods and devices 10.1, 10.2 are combined to be one unified device 10.3. Crystallizing the combined embodiments above and the idea of FIG. 11, the JPEG quality factor qf is thus connected to the crop size of the ROI1-ROI3. A smaller crop size of the ROI allows for a higher quality factor qf (less compression) to be set and still have a smaller file size. The actual image details are preserved better when using cropping, no interpolation and higher quality factor, in comparison to cropping, interpolation and lower quality factor.

If the image is interpolated into bigger resolution afterwards, the JPEG-compression artefacts will not become as visible as in a case in which the JPEG quality factor is static, because there will be less JPEG compression artefacts due to the increased quality factor. One skilled in the art may also combine the embodiments of FIGS. 7 and 11, however without excluding the other embodiment combinations.

Yet according to one embodiment the size limits according to the invention and presented above need not necessarily be equal or smaller than the nominal resolution of the sensor 13, by which the primary image PIM is produced with co-operation of the optics 14. The only conditions for the minimum and maximum size limits according to the invention are that 1) min_image_size<=max_image_size and 2) min_image_size>0.

Figure 12:
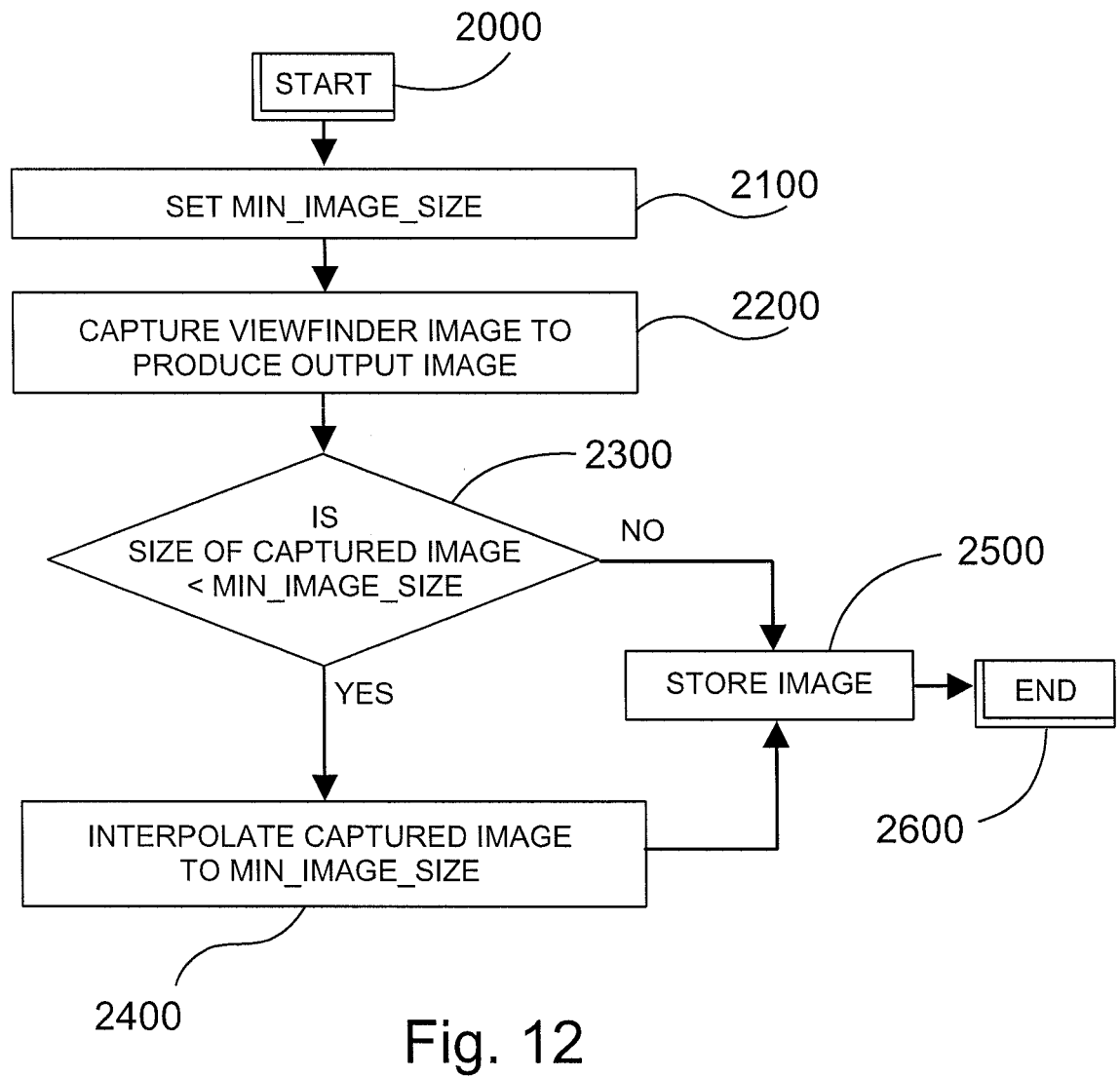

One example of this kind of embodiment may be the situation in which the user wants to perform digital imaging with his or her camera device in order to prepare hardcopies from the produced digital images by using the image printer device. This embodiment is presented as a flowchart in FIG. 12. If the nominal resolution of the sensor 13 of the camera device would be, for example, 0.3 Mpix (=VGA resolution) and the default printing size of the image printer device would be, for example, 1375664 pix then, according to the first embodiment, the whole primary image area may be interpolated from 0.3 Mpix to 1375664 pix that is now set to be max_image_size and min_image_size (stage 2100). According to this embodiment, the images produced by VGA sensor 13 are able to be fitted precisely to the image printer device. Thus, in this embodiment the cropping process isn't necessarily performed at all, but all of the sensor data captured in stage 2200 is interpolated in stage 2400 from the nominal sensor resolution to the precise image size being characteristic of the image printing device. This is performed if the size condition of stage 2300 is fulfilled, which means that the nominal resolution of the sensor 13 is smaller than the min_image_size set to be used in this connection.

Other universal stages 2000, 2500, 2600 were described already in the above embodiments. Of course, according to a second embodiment, one versed in the art may apply this kind embodiment to the embodiments presented already above in FIGS. 3-7, 9 and 11, in which the cropping processes were performed.

In the embodiment above, in which the size limits are equal or greater than the nominal sensor resolution and no cropping is performed at all, a reference is made to the device 10.3 (presented in FIG. 10). There is also a program product 33 having code means to perform scaling measures according to this embodiment. Code means may mainly correspond the code means 31.1-31.10 in connection with FIG. 1, but now tailored to the concerned embodiment. If cropping is not performed, the display 11 is only intended to be a viewfinder and possible interface for the user interface UI 11. There, the image processor 12 performs scaling operations for the primary image in order to produce the output image having the size of the set size setting. Thus, one versed in the art recognizes that all combinations between different embodiments presented in connection with this application are possible.

The motivation for the embodiments above arises from the reason, for example, that the user may want to prepare hardcopies having the size, for example, 4"×6" and the resolution 254 dpi, and the user also wants the digital camera device 10.3 to perform the interpolation processing. The advantage that is achieved by this is that the interpolation is now carried out, among others, before the sharpening and the JPEG-encoding. This avoids the magnification of the sharpening and JPEG artefacts, and produces better sharpening results. Thus, these embodiments remove the need for the post-processing of the image intended to be printed that would otherwise be performed by the digital printing service in which the cropped or non-cropped VGA image would be interpolated to the size of 1.38 Mpix before printing process, for example. Interpolating the image after JPEG-encoding would magnify the artefact effects.

FIGS. 1, 8 and 10 present rough schematic views of application examples of a program products 30.1, 30.2 according to the inventions. The program products 30.1, 30.2 are intended to perform in connection with the digital zoom function 35 in order to form an output image in a digital camera device 10.1-10.3 according to the invention. The program products 30.1, 30.2 may include a storing means, such as, a memory medium MEM and also a program codes 31, 32, 33 executable by the processor unit 12 of the devices 10.1-10.3 and written in the memory medium MEM for dealing out the digital zooming procedure in accordance with the methods of the invention, at least partly in the software level. The memory medium MEM for the program codes 31, 32 may be, for example, a static or dynamic application memory of the device 10.1-10.3, wherein it can be integrated directly in connection with the imaging application or more specifically in connection with the digital zoom function 34.

The program codes 31, 32, 33 may include several code means 31.1-31.10, 32.1-32.4 described above, which can be executed by processor 12 and the operation of which can be adapted to the method descriptions just presented above. The code means 31.1-31.10, 32.1-32.4 may form a set of processor commands executable one after the other, which are used to bring about the functionalities desired in the invention in the equipment 10.1-10.3 according to the invention. The invention does not have major impact on the implementation details of the digital zoom function 35. The implementation details depend on the product.

When considering the basic idea of the invention after the digital zoom function 35 is activated, the original image PIM (produced by the sensor and optics 13, 14) is cropped according to the digital zoom factor. It doesn't matter that the resolution of the output image OIM1-OIM3 gets smaller due to cropping, because no additional real information would be introduced by the interpolation or upscaling measures anyway. It makes no sense, especially in mobile communication devices (cf. 100 kB file size limitations of MMS (Multimedia Messaging Service)), to interpolate into a bigger image (=bigger file size) from the cropped image. Sending the image, opening/processing of the image etc. is faster with the cropped image. For sending and receiving images, the devices 10.1-10.3 may include communication modules in order to communicate in a network system (not shown). The image can be interpolated into bigger resolution, afterwards, if it is required for some reason, for example, the embodiment relating to quality factor.

Some of the advantages are explained already in description above. Presented here are some real situations and achieved advantages, which may appear during the use of the digital imaging product 10.1-10.3.

Example 1

The photo print service company X uses 254 dpi printing resolution (typical at the moment of filing). The user wants to take pictures with his 4 Mpix digital camera device and have postcard size (10×15 (=4"×6")) printouts of them from this photo service X. Now, the user actually needs ~1 Mpix images and not 4 Mpix images, because the image files will be downscaled to ~1 Mpix size anyway in the photo service before printing. The accurate size for the image having postcard size (10×15) is 4×254×6×254=1548384 pix and for the image having postcard size (10×13) is 4×254×4×254×4/3=996×1354=1375664 pix. These exact sizes are cited above ~1 Mpix. The user sets max_image_size to 4 Mpix and min_image_size to 1548384 pix or 1375664 pix, and can use the digital camera 10.1 normally. It would not be wise to use the traditional approach, in which the cropped image is interpolated back to original resolution, and then the image is again downscaled before printing. Interpolating/downscaling back and forth deteriorates the image quality.

From the viewpoint of UI convenience, it is also possible to set, in the user interface (UI), the DPI value and the size of the photocopy intended to be printed instead of the sizes calculated above. In this kind of UI implementation, the user is not required to determine the exact pixel values described above. Also, if the user knows at the moment of digital imaging that he or she is going to utilize only the photo service X for producing hardcopies, then it may be useful to set max_image_size=min_image_size.

Example 2

Advanced users can have better control over the digital zoom operation (use of interpolation), and at the same time normal users don't have to know anything more about digital zoom than with any other approach.

Example 3

The user does not need to lower the target resolution when he wants to use smarter digital zoom (like in prior art solutions, for example), as the output resolution will be decreased automatically when digital zoom factor is bigger than ×1.

Example 4

Very big digital zoom does not cause the image to be cropped into very small image as in some prior art solutions, but the user can set a lower limit for the resolution, e.g. according to desired printing resolution.

Example 5

The fact that JPEG quality factor is connected to the digital zoom factor (=cropping factor) improves the image quality.

Example 6

The cropped images are faster to process/send than the interpolated images, especially in mobile communication devices. The user can zoom into the cropped image later in some suitable tool (the "Media Gallery") by using e.g. bicubic interpolation, as it is not restricted by the invention.

It should be understood that the above specification and the figures relating to it are only intended to illustrate the present invention. Thus, the invention is not limited only to the embodiments presented above or to those defined in the claims, but many various such variations and modifications of the invention will be obvious to the professional in the art, which are possible within the scope of the inventive idea defined in the appended claims.

What is claimed is:

1. An apparatus comprising:
   a digital zoom function configured to form an output image,
   a sensor and optics configured to produce a primary image,
   a display in which the primary image is arranged to be cropped in connection with the digital zoom function in order to form the said output image, and
   an image processor configured to store the output image using a quality factor set for the output image as an input parameter for a JPEG encoder,
   wherein the quality factor is calculated using the size of the cropped primary image and an old quality factor.

2. The apparatus according to claim 1, configured to calculate the quality factor by using the equation of:

$$qf\_new = qf\_old + (\{1,0-scale\} * \{max[96, qf\_old] - qf\_old\})$$

wherein $$scale = (crop\_xsize/original\_xsize) * (crop\_ysize/original\_ysize)$$

and in which
qf_new=new quality factor,
qf_old=old quality factor,
crop_xsize=size of ROI in horizontal direction
crop_ysize=size of ROI in vertical direction and
original_xsize, original_ysize=size of primary image produced by the sensor.

3. The apparatus according to claim 1, further comprising:
   a user interface configured to set one or more size limits for the output image,
   wherein the image processor is configured to set a size for the said output image based on the cropping of the primary image, and to perform scaling operations for the cropped primary image in which the scaling operations depend on the size of the cropped primary image in relation to the one or more size limit.

4. The apparatus according to claim 3, wherein one of the one or more size limits is a minimum size for said output image to which minimum size the image processor is configured to upscale the cropped primary image if the size of the cropped image is below said minimum size.

5. The apparatus according to claim 3, wherein one of the one or more size limits is an output image size for said output image to which output image size the image processor is configured to scale the cropped primary image in an established manner.

6. A method comprising:
   producing a primary image,
   cropping the primary image in connection with a digital zooming procedure in order to form an output image,
   calculating with an image processor a quality factor using the size of the cropped primary image and an old quality factor, and
   storing with the image processor the output image using said quality factor as an input parameter for a JPEG encoder.

7. The method according to claim 6, comprising calculating the quality factor by using the equation of:

$$qf\_new = qf\_old + (\{1,0-scale\} * \{max[96, qf\_old] - qf\_old\})$$

wherein $$scale = (crop\_xsize/original\_xsize) * (crop\_ysize/original\_ysize)$$

and in which
qf_new=new quality factor,
qf_old=old quality factor,
crop_xsize=size of ROI in horizontal direction
crop_ysize=size of ROI in vertical direction and
original_xsize, original_ysize=size of primary image produced by sensor.

8. The method according to claim 6, comprising using the quality factor as an input parameter for a JPEG encoder and compressing the output image to JPEG format.

9. The method according to claim 6, comprising:
   setting one or more size limits for the output image via a user interface,
   setting a size for the said output image with an image processor based on the cropping of the primary image, and
   performing scaling operations for the cropped primary image in which the scaling operations depend on the size of the cropped primary image in relation to the one or more size limit.

10. A non-transitory computer-readable storage medium encoded with instructions that, when executed by a computer, perform the instructions comprising:
    cropping in a user interface, in connection with a digital zooming procedure, a primary image produced by an imaging means in order to form an output image,
    calculating a quality factor using the size of the cropped primary image and an old quality factor, and
    storing the output image using said quality factor as an input parameter for a JPEG encoder.

11. The computer-readable storage medium according to claim 10, wherein the quality factor is calculated by using the equation of:

$$qf\_new = qf\_old + (\{1,0-scale\} * \{max[96, qf\_old] - qf\_old\})$$

wherein $$scale = (crop\_xsize/original\_xsize) * (crop\_ysize/original\_ysize)$$

and in which
qf_new=new quality factor,
qf_old=old quality factor, crop_xsize=size of ROI in horizontal direction
crop_ysize=size of ROI in vertical direction and
original_xsize, original_ysize=size of primary image produced by sensor.

12. The computer-readable storage medium according to claim 10, wherein the instructions comprise:
setting one or more size limits for the output image via a user interface,
setting a size for the said output image with an image processor based on the cropping of the primary image, and
performing scaling operations for the cropped primary image in which the scaling operations depend on the size of the cropped primary image in relation to the one or more size limit.

* * * * *